United States Patent
Craig

(10) Patent No.: US 7,396,192 B2
(45) Date of Patent: *Jul. 8, 2008

(54) HELICAL CUTTING INSERT WITH PROGRESSIVE CUTTING EDGE

(75) Inventor: Karen A. Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/565,139

(22) Filed: Nov. 30, 2006

(65) Prior Publication Data

US 2007/0086865 A1    Apr. 19, 2007

Related U.S. Application Data

(62) Division of application No. 11/150,958, filed on Jun. 13, 2005, now Pat. No. 7,229,236.

(51) Int. Cl.
*B23C 5/20* (2006.01)
*B26D 7/00* (2006.01)

(52) U.S. Cl. .................. 407/113; 407/114; 407/116

(58) Field of Classification Search ............. 407/113, 407/115, 114, 116, 33–35, 42–43, 53–67
See application file for complete search history.

(56) References Cited

U.S. PATENT DOCUMENTS

| | | |
|---|---|---|
| 3,701,187 A | 10/1972 | Erkfritz |
| 3,715,788 A | 2/1973 | Ayer |
| 3,861,011 A | 1/1975 | Nose et al. |
| 4,182,587 A * | 1/1980 | Striegl .................. 407/113 |
| 4,190,128 A * | 2/1980 | Emmerich .............. 175/420.1 |
| 4,294,566 A | 10/1981 | Boone |
| 4,575,285 A | 3/1986 | Blakesley |
| 4,597,695 A | 7/1986 | Johnson |
| 4,618,296 A | 10/1986 | Allaire et al. |
| 4,714,383 A | 12/1987 | Shimomura et al. |
| 4,790,693 A | 12/1988 | Koblesky |
| 4,812,087 A | 3/1989 | Stashko |
| 4,838,739 A | 6/1989 | Stashko |
| 4,898,500 A | 2/1990 | Nakamura et al. |
| 4,936,361 A | 6/1990 | Mercier et al. |
| 5,020,944 A | 6/1991 | Pawlik |
| 5,028,175 A | 7/1991 | Pawlik |
| 5,071,292 A * | 12/1991 | Satran .................. 407/116 |
| 5,083,887 A | 1/1992 | Dotany |
| 5,145,295 A | 9/1992 | Satran |

(Continued)

OTHER PUBLICATIONS

Catalogue, "New! VoMax Standards and Specials," Ingersoll Cutting Tools, Rockford, Illinois, BRO-015 (11-03), 36 pages.

*Primary Examiner*—Willmon Fridie
(74) *Attorney, Agent, or Firm*—Larry R. Meenan

(57) ABSTRACT

An indexable, helical cutting insert includes at least one axial clearance slash extending from a bottom surface to one of said side walls forming a wiper on an edge of the axial clearance slash. In another embodiment, the cutting insert includes at least one inside cutting edge that extends outwardly a distance from the side wall. In another embodiment, the helical cutting insert includes at least one progressive cutting edge. In another embodiment, the cutting insert includes at least one helical cutting edge that is curved inwardly to enable the cutting insert to perform machining operations on cutters having different diameters.

7 Claims, 9 Drawing Sheets

U.S. PATENT DOCUMENTS

| | | |
|---|---|---|
| 5,207,538 A | 5/1993 | Satran |
| 5,226,761 A | 7/1993 | Satran et al. |
| 5,244,318 A | 9/1993 | Arai et al. |
| 5,272,940 A | 12/1993 | Diskin |
| 5,330,295 A | 7/1994 | Pawlik |
| 5,586,843 A | 12/1996 | Minicozzi |
| 5,741,095 A | 4/1998 | Charron et al. |
| 5,775,855 A | 7/1998 | Reiterman et al. |
| 5,791,831 A | 8/1998 | Shimano et al. |
| 5,810,519 A | 9/1998 | Vogel et al. |
| 5,913,644 A | 6/1999 | DeRoche et al. |
| 5,915,888 A | 6/1999 | Minicozzi |
| 5,944,456 A | 8/1999 | Shirley et al. |
| 5,947,650 A | 9/1999 | Satran et al. |
| 5,964,552 A | 10/1999 | Larsen |
| 6,050,752 A | 4/2000 | DeRoche |
| 6,053,672 A | 4/2000 | Satran et al. |
| 6,142,716 A | 11/2000 | Jordberg et al. |
| 6,193,446 B1 | 2/2001 | Astrom et al. |
| 6,196,770 B1 | 3/2001 | Astrom et al. |
| 6,224,299 B1 | 5/2001 | Frecska et al. |
| 6,238,146 B1 | 5/2001 | Satran et al. |
| 6,244,791 B1 | 6/2001 | Wiman et al. |
| 6,254,316 B1 | 7/2001 | Strand |
| 6,773,209 B2 | 8/2004 | Craig |
| 6,811,359 B2 * | 11/2004 | Craig .......................... 407/35 |
| 2001/0014259 A1 | 8/2001 | Inayama |
| 2002/0054793 A1 | 5/2002 | Kataoka et al. |
| 2002/0098048 A1 | 7/2002 | Satran |
| 2002/0122699 A1 | 9/2002 | Noggle |

* cited by examiner

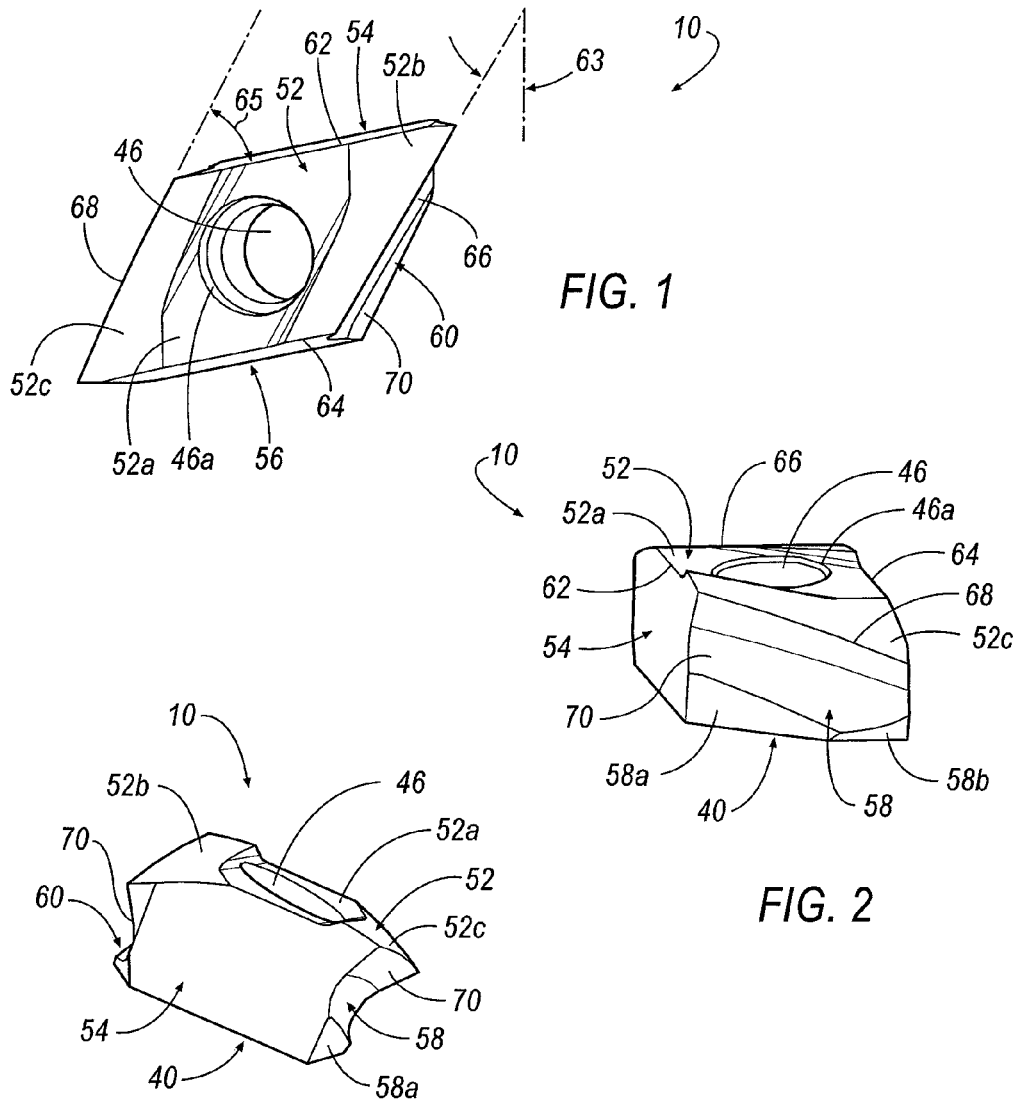
FIG. 1
FIG. 2
FIG. 3
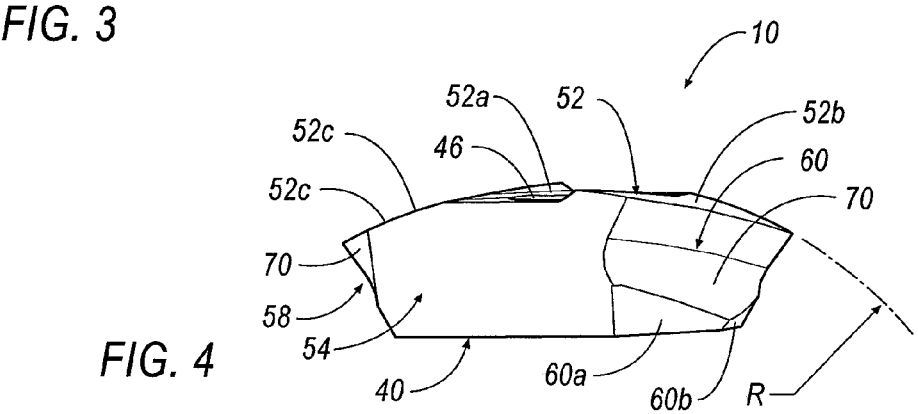
FIG. 4

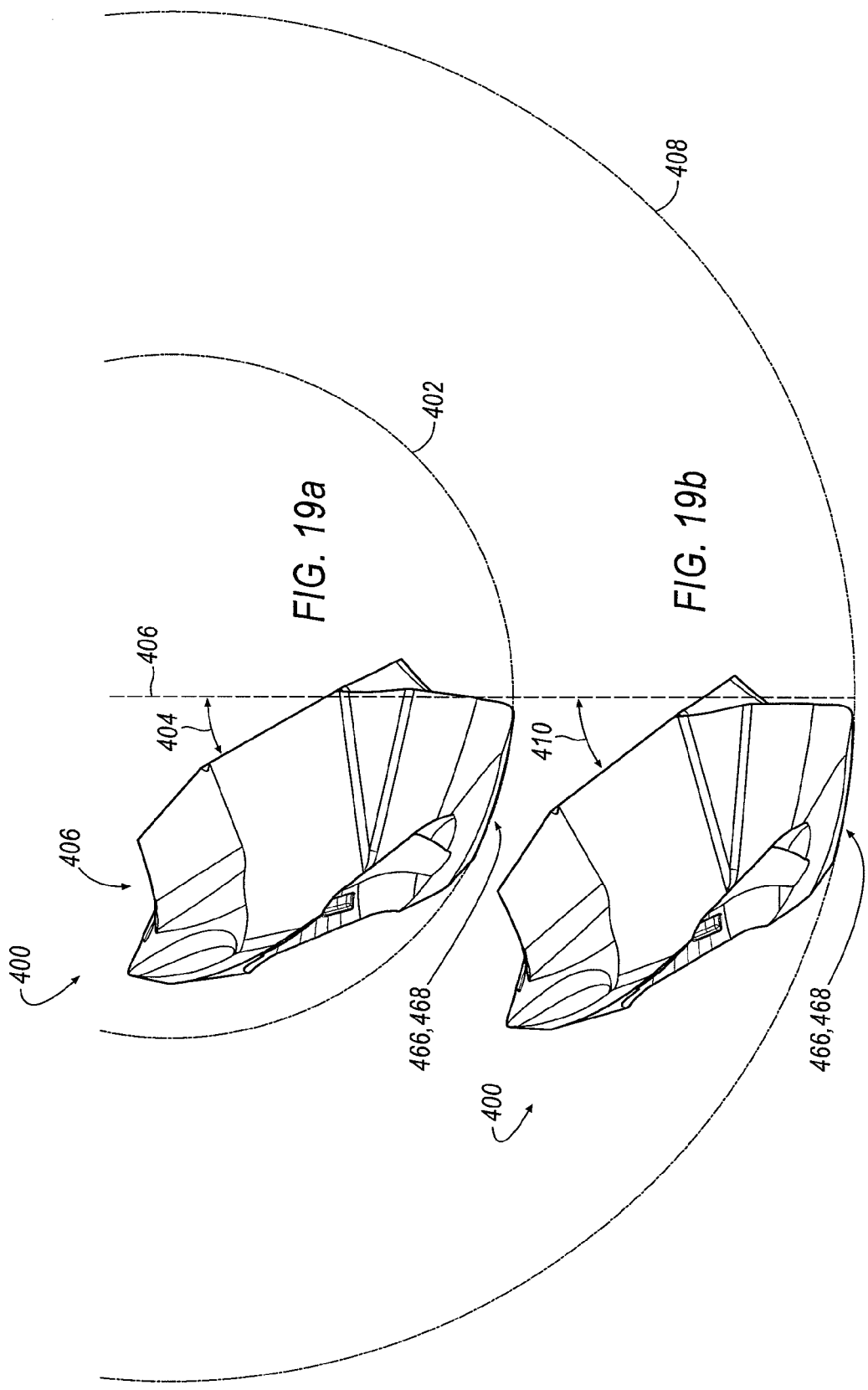

HELICAL CUTTING INSERT WITH PROGRESSIVE CUTTING EDGE

CROSS-REFERENCE TO RELATED APPLICATION

This application claims the benefit of U.S. patent application Ser. No. 11/150,958 filed Jun. 13, 2005, and is related to U.S. Pat. No. 6,773,209, filed May 31, 2002, entitled "Helical Insert and Cutter Bodies", both which are incorporated herein by reference.

BACKGROUND OF THE INVENTION

1. Field of the Invention

The present invention relates to cutters and cutting inserts used thereon, and in particular to a cutter system that includes a cutter body with tangentially-mounted, indexable, helical cutting inserts with multiple cutting edges.

2. Description of the Related Art

Currently, the use of an indexable insert is not the first choice for small machine tools because the spindles on such small machines produce relatively lower horsepower and torque than larger machine tools. Because current cutting insert designs need more power to cut effectively, small machine tools are typically relegated to using solid end mill cutters and shell end mill cutters. However, solid end mill cutters and shell end mill cutters wear as they lose diameter, and if broken, can be entirely scraped. In addition, the limited size of the cutters that can be used with indexable insert designs may result in a loss of productivity.

The inventor of the present invention has recognized these and other problems associated with end mill cutters, such as solid end mill cutters and shell end mill cutters, which utilize a helical cutting edge geometry.

SUMMARY OF THE INVENTION

To solve these problems, the present invention provides an improved cutter body that utilizes an indexable cutting insert design that has at least two indexable cutting edges. High positive axial and radial rake angles of the improved indexable cutting insert design uses less power and torque than conventional inserts, thereby allowing smoother cutting action and increased feedrates that would have previously stalled a smaller machine tool. In addition, the cutting insert of the invention can be used in larger cutters with an increased number of cutting edges to increase productivity on both small and large machine tools. Further, the only scrap is the cutting insert and not the entire cutter body, thereby minimizing production costs as compared to conventional designs.

The present invention comprises an indexable cutting insert that includes a flat back that is held in a mounting pocket of a cutter body. The mounting pocket can be designed for ease of manufacture and repeatability. Stub length tooling may be used for rigid setups and lower cost. The cutting insert is located in the mounting pocket on two outboard walls. The cutting insert is secured to the cutter body by use of a screw in a cross hole fashion. The face of the cutting insert has a helical cutting edge on two sides and can be indexed by rotating the cutting insert approximately 180 degrees. With the use of the cutting insert of the invention, the cutter body has a maximum core diameter for strength and rigidity, thereby minimizing tool deflection and extending the life of the cutter body. The cutting insert of the invention can be used in a variety of milling cutter body designs, such as end mill cutters, shell end mill cutters, or the like.

Various aspects and advantages of this invention will become apparent to those skilled in the art from the following detailed description of the preferred embodiment, when read in light of the accompanying drawings.

BRIEF DESCRIPTION OF THE DRAWINGS

FIG. 1 is a top perspective view of an indexable, helical cutting insert having two helical cutting edges according to an exemplary embodiment of the invention;

FIG. 2 is a side perspective view of the cutting insert of FIG. 1;

FIG. 3 is another side perspective view of the cutting insert of FIG. 1;

FIG. 4 is a side view of the cutting insert of FIG. 1;

FIGS. 19*a* and 19*b* is a side view of the cutting insert of FIG. 18 when used on a cutter having two different diameters.

DESCRIPTION OF THE PREFERRED EMBODIMENT

Figure 5:
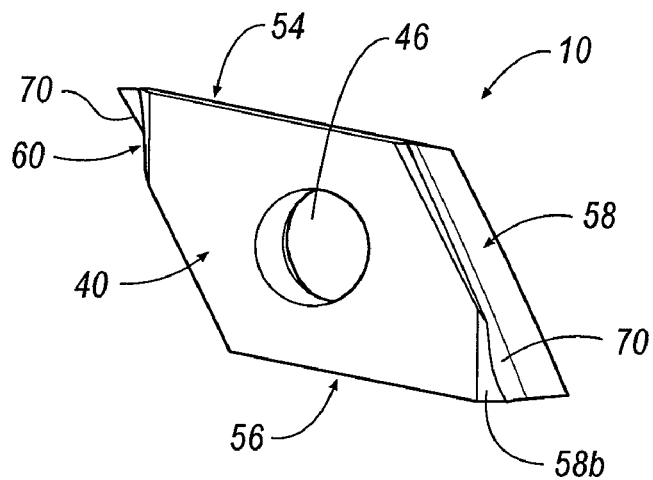
FIG. 5 is a perspective view of the bottom of the cutting insert of FIG. 1.
Figure 6:
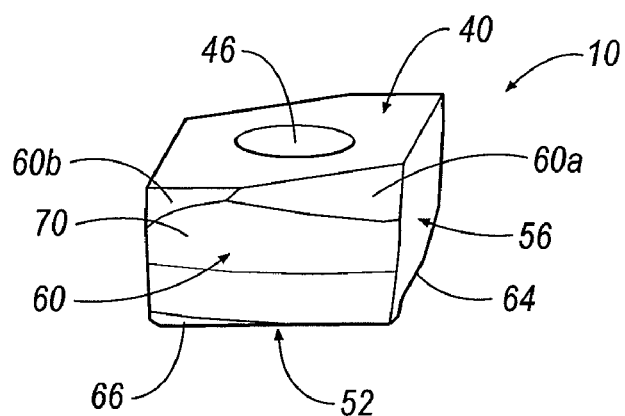
FIG. 6 is another perspective view of the bottom of the cutting insert of FIG. 1.
Figure 7:
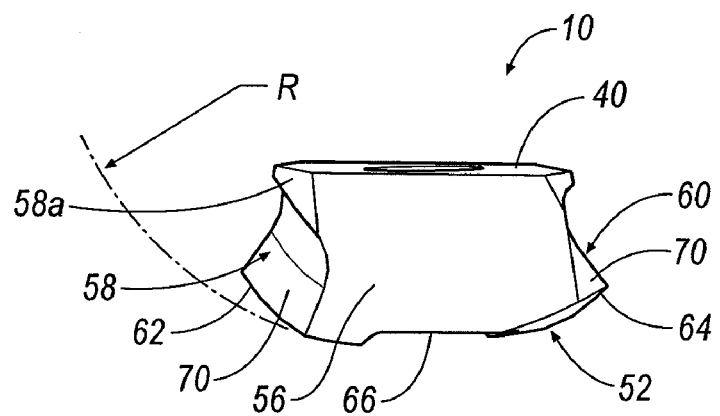
FIG. 7 is a another perspective view of the side of the cutting insert of FIG. 1.

Referring now to FIGS. 1-8, a cutting insert 10 is shown according to an exemplary embodiment of the invention. The cutting insert 10 is generally diamond in shape and includes a front face or top surface 52, a pair of opposed side walls or surfaces 54 and 56, another pair of opposed side walls or surfaces 58 and 60, a base surface or back face 40. The top surface 52 includes a substantially flat central portion 52*a*, a first curved facet surface 52*b*, and a second curved facet surface 52*c* located on the opposite side of the central portion 52*a*. The side wall 58 includes a first substantially flat faceted surface 58*a*, and a second substantially flat faceted surface 58*b* having a smaller surface area than the faceted surface 58*a*. Similarly, the opposite side wall 60 includes a first substantially flat faceted surface 60*a*, and a second substantially flat faceted surface 60*b* having a smaller surface area than the faceted surface 60*a*. The other two side walls 54 and 56, and the back surface 40 are substantially flat.

Formed at the intersection between the top surface 52 and the side walls 54, 56, 58 and 60 are principally four edges, namely a pair of opposed and spaced apart edges 62 and 64, and another pair of opposed and spaced apart edges 66 and 68. At least one of the edges 62, 64, 66 and 68 is a helical cutting edge, and preferably at least the two opposite edges 66 and 68 are helical cutting edges, thereby allowing the cutting insert 10 to be indexable by rotating the cutting insert 10 by approximately 180°. The helical cutting edges 66 and 68 form an angle 63 of approximately 30° with the central, longitudinal axis of the cutter body (along the z-axis) to cut a true 30° helix about the cutting diameter of the cutter. Although only the helical cutting edge 66 to have an angle of approximately 30°, it should be realized that the helical cutting edge 68 is substantially parallel to the helical cutting edge 66, and thus will also have an angle of approximately 30°. It will be appreciated that the invention is not limited by the angle of the cutting edges, but the invention can be practiced with any desirable angle for the helical cutting edges 66, 68. For example, other shapes of inserts are contemplated that include helical cuts 70 in the side walls 58 and 60 with the angle 63 for the helix that ranges between 0° and 60°. In addition, the helical cutting edges 66 and 68 form an angle 65 of approximately 60° with respect to the edges 62 and 64, respectively. However, the angle 65 can be any desirable angle between about 20° and 90°.

Figure 8:
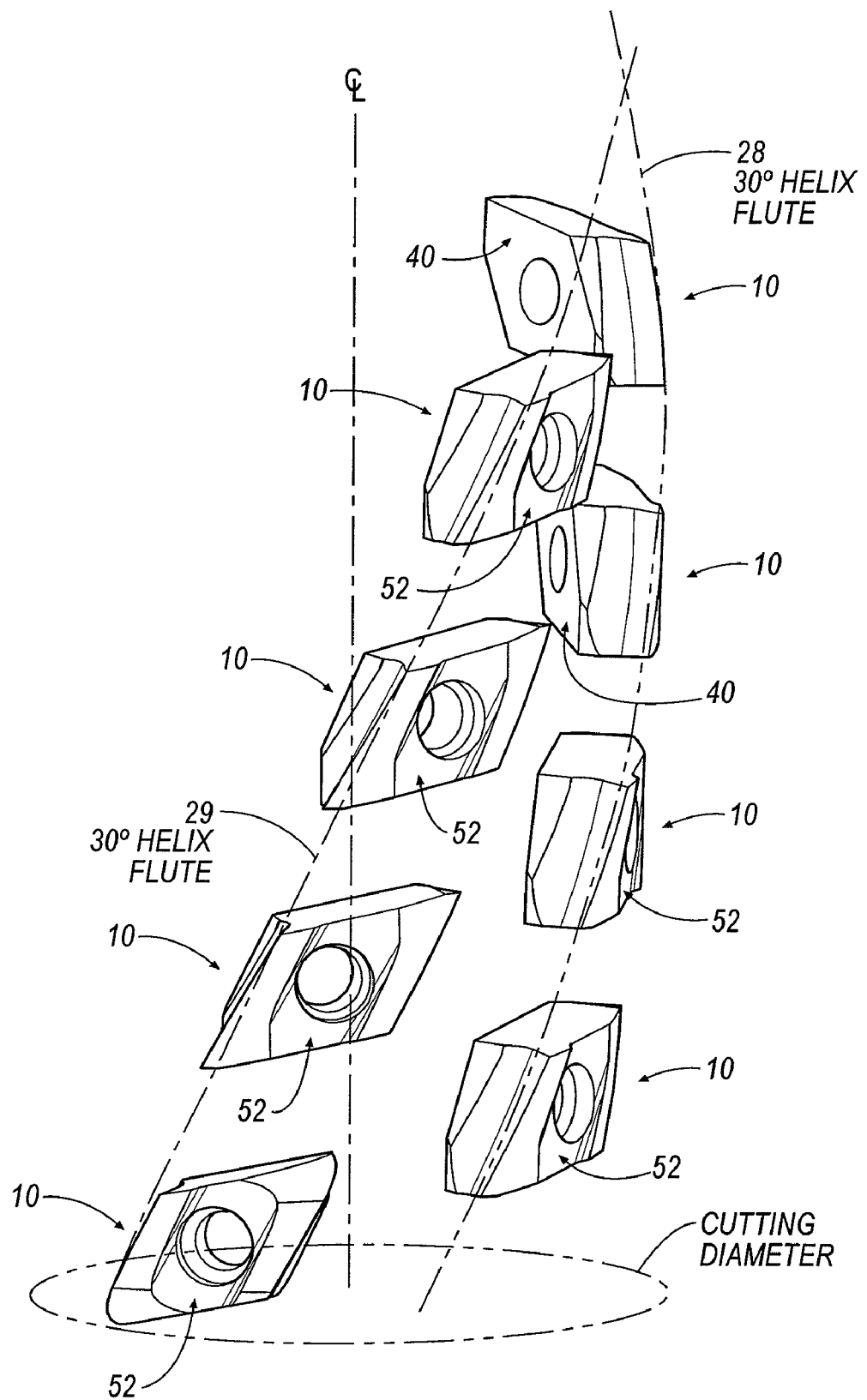
FIG. 8 is a diagram showing the true helix of the cutting inserts of the invention.

In accordance with one aspect of the invention, the top surface 52 of the insert 10, and in particular the curved facet surfaces 52b and 52c form a rounded or radiused top surface having a radius of curvature, R, as best shown in FIG. 4. Preferably, the radius of curvature, R, is approximately equal to a cutting diameter of the milling body, as shown in FIG. 8. Because of the radius of curvature, R, the top surface 52 follows the curvature of the outer surface of the head 18 to provide a true helical cutting insert that follows the curvature of the outer surface of the head 18, unlike conventional inserts with front faces or surfaces that are substantially flat.

In accordance with another aspect of the invention, a helical cut face 70 is formed in two opposite side surfaces 58 and 60 with respect to a central, longitudinal axis of the cutter body to form a side face helix that creates a smooth cutting action as a solid helical end mill, unlike conventional inserts. In addition, the helical cut face 70 on the opposite side surfaces 58 and 60 allows the cutting insert 10 to be indexable on two sides by rotating the cutting insert 10 approximately 180°. High positive radial and axial rake angles enable free cutting machining with a fine finish and low horsepower consumption.

As is known in the art, the cutting insert 10 can be tightly secured to the mounting pocket by a locking fastener (not shown), such as an Allen or Torx screw, or the like, that passes through a clearance hole 46 located in the cross hole location of the cutting insert 10. The clearance hole 46 includes a tapered counterbore 46A, which is engaged by a corresponding tapered surface on the head of the locking fastener, thereby allowing the cutting insert 10 to be tightly secured to the pocket face. The location of the clearance hole 46 in the cross hole location of the cutting insert 10 allows an unobstructed cutting face and a larger diameter center core in the cutter body, thereby creating maximum strength and allowing longer cutting lengths.

Figure 9:
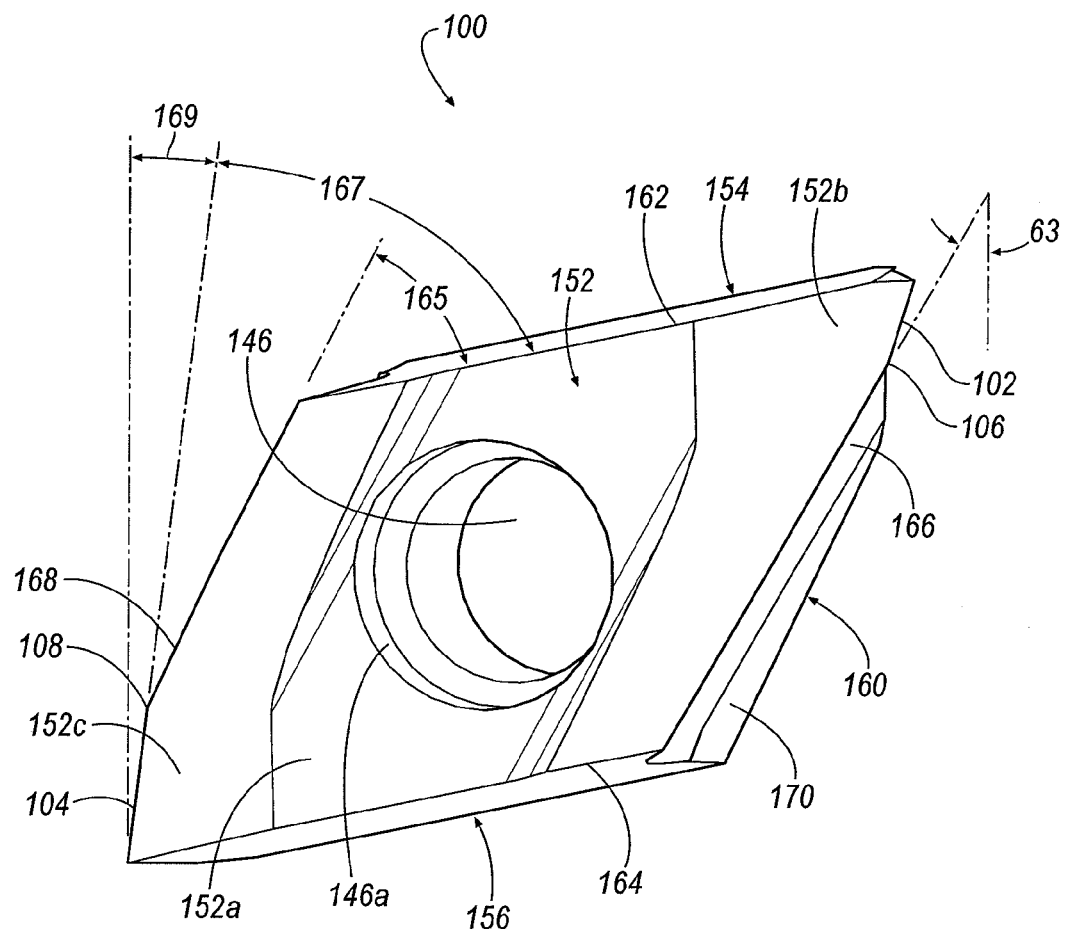
FIG. 9 is a top perspective view of an indexable, helical cutting insert according to another exemplary embodiment of the invention.
Figure 10:
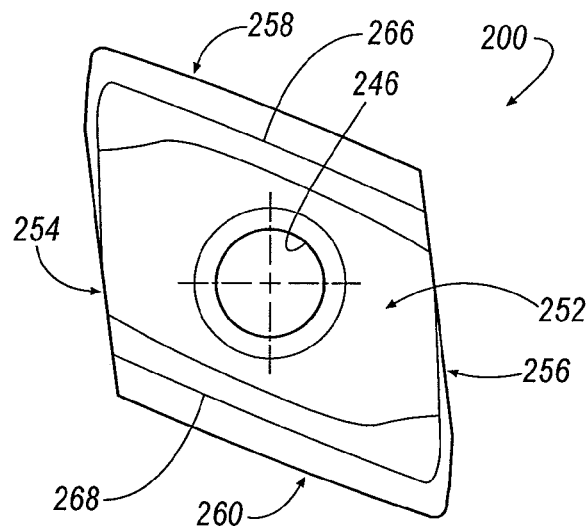
FIG. 10 is a top view of an improved cutting insert according to yet another exemplary embodiment of the invention.
Figure 11:
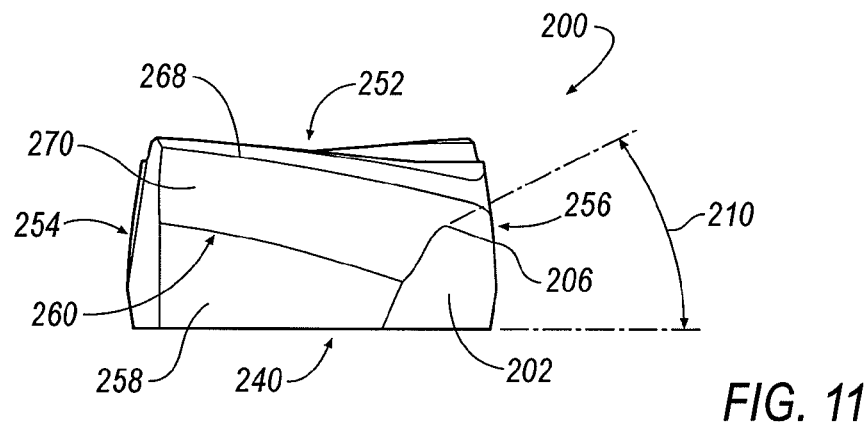
FIG. 11 is a side view of the cutting insert of FIG. 10.
Figure 12:
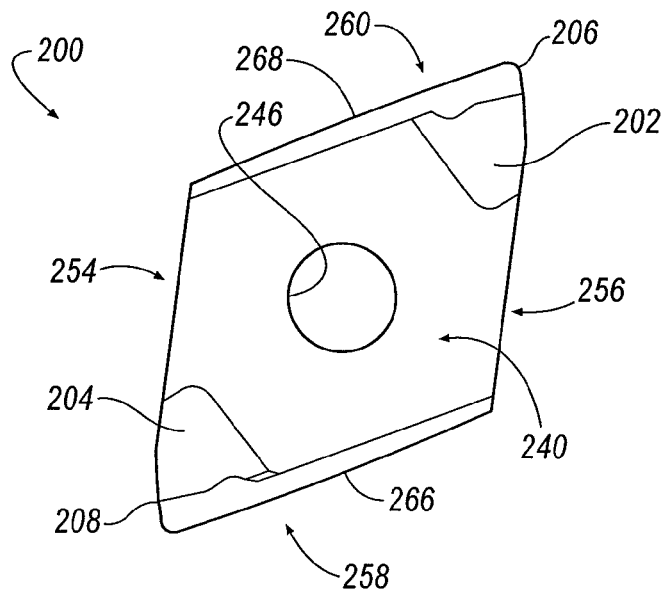
FIG. 12 is a bottom view of the cutting insert of FIG. 10.
Figure 13:
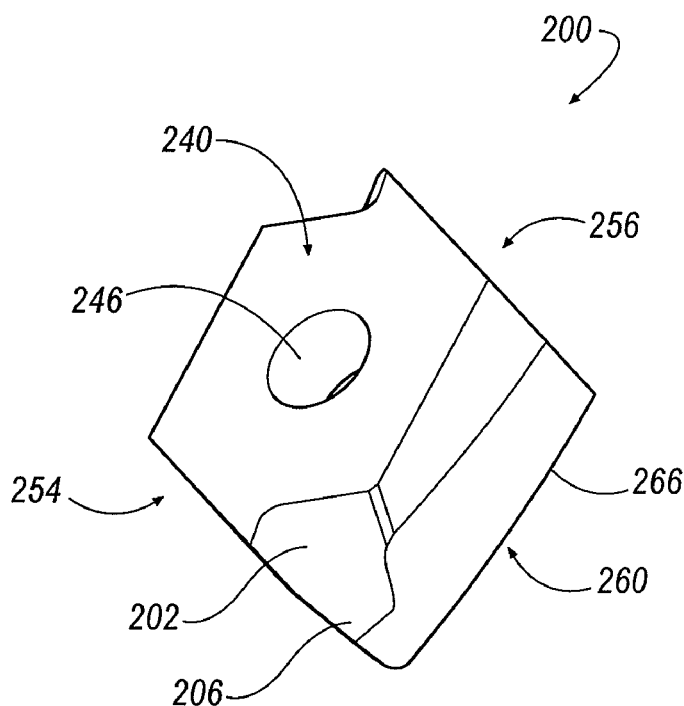
FIG. 13 is a bottom perspective view of the cutting insert of FIG. 10.
Figure 14:
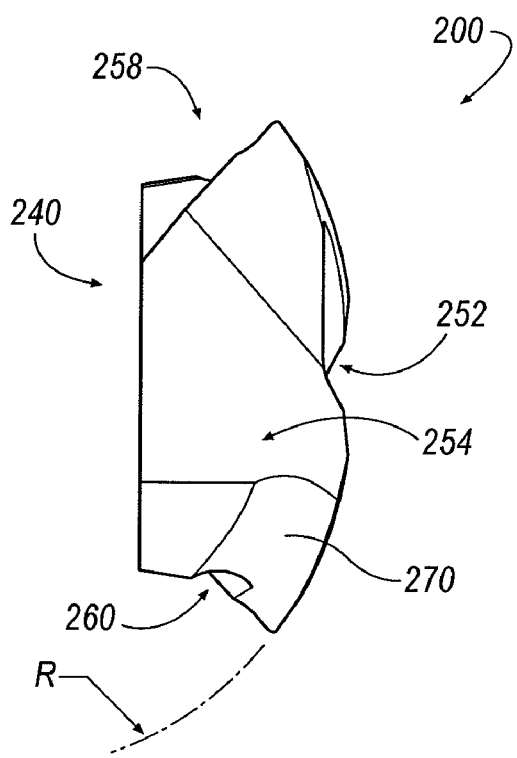
FIG. 14 is another side view of the cutting insert of FIG. 10.

In the exemplary embodiment shown in FIG. 1, the cutting edges 66 and 68 are non-progressive edges that form an angle 65 with respect to the edges 62 and 64, respectively. Referring now to FIG. 9, a helical cutting insert 100 is shown according to another exemplary embodiment of the invention. Similar to the cutting insert 10, the face of the cutting insert 10 has helical cutting edges on two sides and can be indexed by rotating the cutting insert 100 approximately 180 degrees. The top surface 152 has a radius of curvature, R, is approximately equal to a cutting diameter of the milling body, as shown in FIG. 8. Because of the radius of curvature, R, the top surface 152 follows the curvature of the outer surface of the head 18 to provide a true helical cutting insert that follows the curvature of the outer surface of the head 18.

However, the helical cutting insert 100 differs from the helical cutting insert 10 in that the helical cutting edge 66 of the helical cutting insert 10 is replaced with helical cutting edges 102 and 166 having a radius blend 106 therebetween. Similarly, the helical cutting edge 68 of the helical cutting insert 10 is replaced with helical cutting edges 104 and 168 with a radius blend 108 therebetween. The combination of the helical cutting edges 102 and 166 along the same side of the helical cutting insert 100 provide a progressive helical cutting edge. Likewise, the combination of the helical cutting edges 104 and 168 along the opposite side of the helical cutting insert 100 provide a second, progressive helical cutting edge.

In the exemplary embodiment shown in FIG. 9, the helical cutting edges 166, 168 form an angle 165 with respect to the edges 162, 164. In addition, the helical cutting edges 102 and 104 form an angle 167 with respect to the edges 162 and 164, wherein the angle 167 is greater than the angle 165. The difference between the angles 165, 167 provides an initial axial rake angle 169 that is lower than the axial rake angle provided by the non-progressive helical cutting edges 166 and 168. Thus, the helical cutting edges 102, 104 provide an initial cutting edge that progresses from a lower axial rake angle as the cutting insert 100 enters the workpiece (not shown) to a relatively higher axial rake angle as the helical cutting insert 100 exits the workpiece. As a result of the lower axial rake angle, the progressive helical cutting edges 102, 104 are relatively stronger than the non-progressive cutting edges 66, 68 of the helical cutting insert 100 of the invention.

In the exemplary embodiment shown in FIG. 1, the cutting edges 66 and 68 are non-progressive edges that form an angle 65 with respect to the edges 62 and 64, respectively. Similarly, the cutting edges 166, 168 of the cutting insert 100 form a substantially similar angle 165 with respect to the edges 162, 164.

Referring now to FIGS. 10-14, an indexable, helical cutting insert 200 is shown according to another exemplary embodiment of the invention. Similar to the cutting inserts 10, 100, the face of the cutting insert 200 has a helical cutting edge on two sides and can be indexed by rotating the cutting insert 200 approximately 180 degrees. In addition, the top surface 52 has a radius of curvature, R, is approximately equal to a cutting diameter of the milling body to provide a true helical cutting insert that follows the curvature of the outer surface of the head 18, as shown in FIG. 8.

However, the helical cutting insert 200 differs from the helical cutting inserts 10, 100 in that the cutting insert 200 include an axial clearance slash 202, 204 forming a wiper 206, 208 on the edge of the axial clearance slash 202, 204. In the illustrated embodiment, the axial clearance slash 202, 204 is in the form of a faceted surface extending from the bottom surface 240 to the side surfaces 254, 256, 258, 260 at an angle 210 in a range between about 10 degrees to about 70 degrees with respect to the bottom surface 240. The purpose of the axial clearance slash 202, 204 and the wiper radius 206, 208 is to produce a fine finish on the workpiece (not shown).

It will be appreciated that the feature of the progressive cutting edges 102, 104 on the helical cutting insert 100 can be included on the helical cutting insert 200 of the invention.

Figure 15:
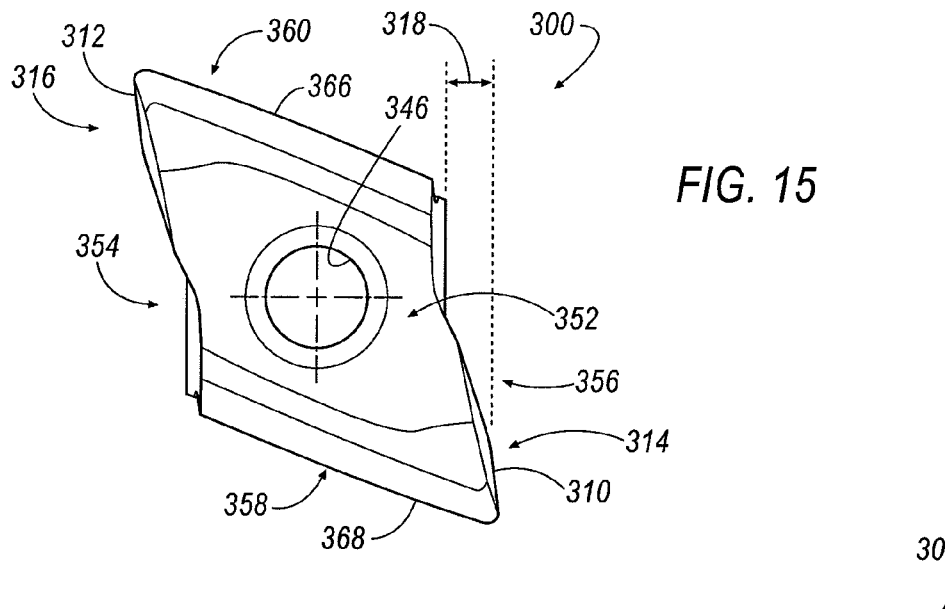
FIG. 15 is a top view of an indexable, helical cutting insert according to yet another exemplary embodiment of the invention.
Figure 17:
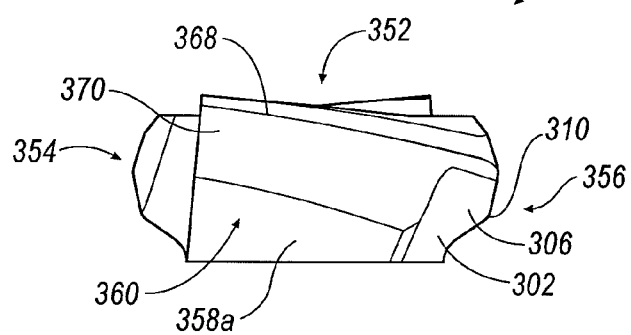
FIG. 17 is a bottom view of the cutting insert of FIG. 15.
Figure 16:
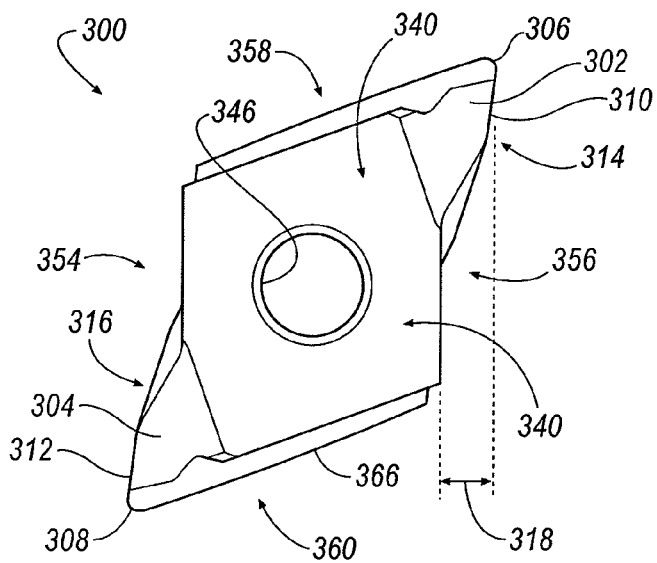
FIG. 16 is a side view of the cutting insert of FIG. 15.

Referring now to FIGS. 15-17, a helical cutting insert 300 is shown according to another exemplary embodiment of the invention. Similar to the cutting inserts 10, 100, 200 the face of the cutting insert 300 has a helical cutting edge on two sides and can be indexed by rotating the cutting insert 300 approximately 180 degrees. In addition, the top surface 352 has a radius of curvature, R, is approximately equal to a cutting diameter of the milling body to provide a true helical cutting insert that follows the curvature of the outer surface of the head 18, as shown in FIG. 8.

In addition, the bottom surface 340 and the side surfaces 354, 356, 358, 360 of the cutting insert 300 include an axial clearance slash 302, 304 forming a wiper 306, 308 on the edge of the axial clearance slash 302, 304, similar to the helical cutting insert 200. In the illustrated embodiment, the axial clearance slash 302, 304 is in the form of a faceted surface having an angle 310 in a range between about 10 degrees to about 70 degrees with respect to the bottom surface 340. The axial clearance slash 302, 304 and the wiper radius 306, 308 produce a fine finish on the workpiece.

However, the cutting insert 300 differs from the helical cutting insert 200 in that the side surfaces 354, 356, 358, 360 of the cutting insert 300 includes a feature that permits a ramp-plunge and feeding (RPF) operation, while maintaining a fine finish on the workpiece. This feature comprises an inside cutting edge 310, 312 that is formed along a portion 314, 316 of the side surfaces 354, 356 that extend outwardly a distance 318 from the remainder of the side surfaces 354, 356 of the cutting insert 300.

It will be appreciated that the features of the progressive cutting edges 102, 104 of the helical cutting insert 100 can be included on the helical cutting insert 300 of the invention.

As described above, the helical cutting inserts 10, 100, 200, 300 include a top surface that has a radius of curvature, R, that is approximately equal to a cutting diameter of the milling body, as shown in FIG. 8. Because of the radius of curvature, R, the top surface follows the curvature of the outer surface of the head 18 to provide a true helical cutting insert with the helical cutting edges that follow the curvature of the outer surface of the head 18. However, the helical cutting edges follow the curvature of the head 18 with a specific diameter, and may produce a concave error in the workpiece when placed in cutters having diameters other than what the cutting inserts 10, 100, 200, 300 were originally designed.

Figure 18:
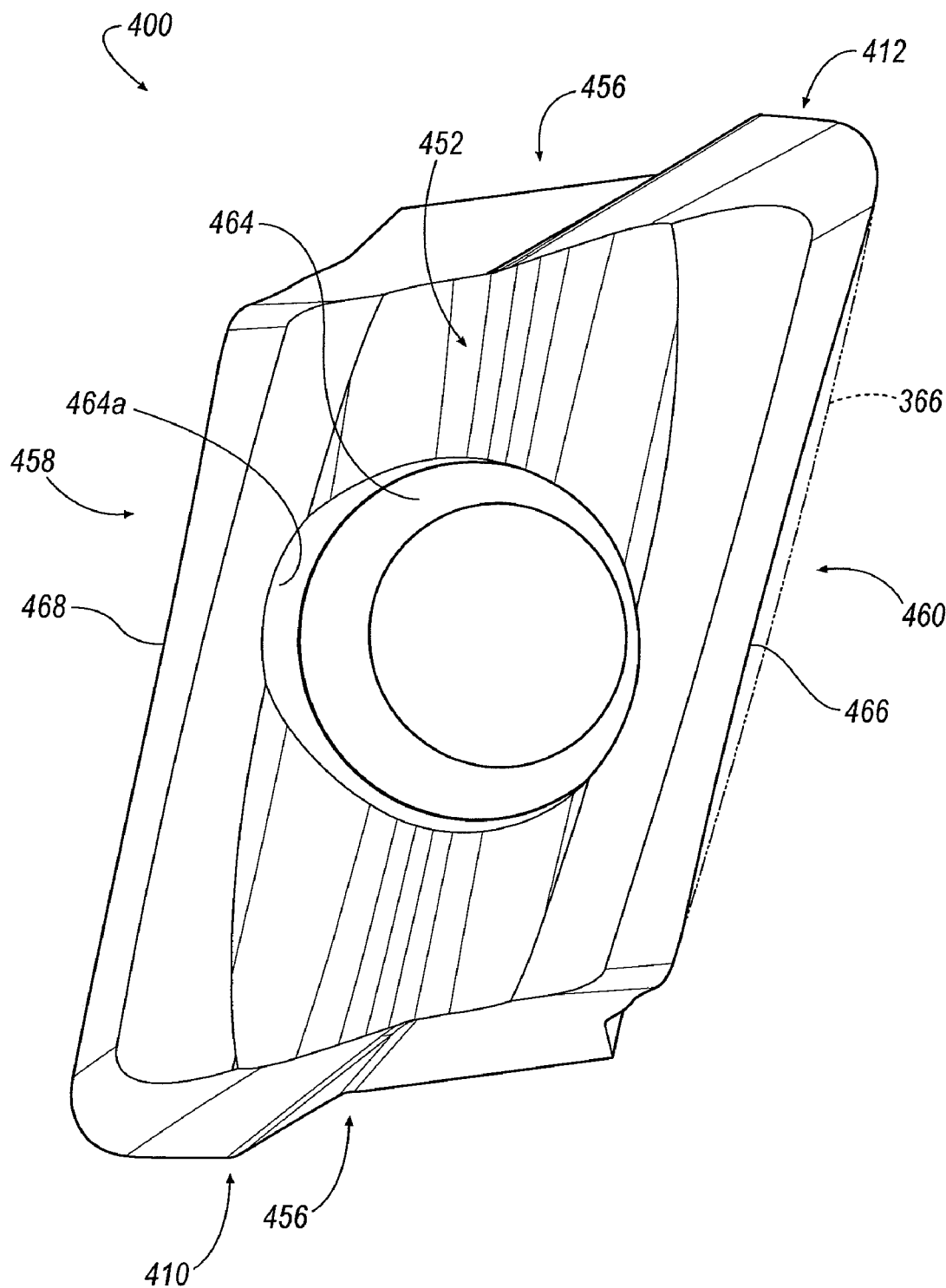
FIG. 18 is a top view of an indexable, helical cutting insert according to yet another exemplary embodiment of the invention.

Referring now to FIGS. 18, 19a and 19b, a helical cutting insert 400 is shown according to another exemplary embodiment of the invention. The helical cutting insert 400 of being used in cutters with different diameters, while maintaining the lead angle of the helical cutting insert 400 substantially constant to greatly minimize any errors in the workpiece. The helical cutting insert 400 is substantially identical to the helical cutting insert 300, except the helical cutting insert 400 includes curved or "inward bowed" helical cutting edges 466, 468, rather than the substantially straight helical cutting edges 366, 368 (only cutting edge 366 is shown as a dashed line in FIG. 18).

As mentioned above, the curved or radiused helical cutting edges 466, 468 allows the helical cutting insert 400 to be positioned in cutters having different diameters, while minimizing lead angle errors and lap lines, as shown in FIGS. 19a and 19b. Without the radiused helical cutting edges 466, 468, the cutter may create a slight concave curve in the workpiece that increases with an increase in the cutting diameter. As shown in FIG. 20, the helical cutting insert 400 can be placed in the cutter with the desired diameter by simply pivoting around a tangent point of the cutting diameter to create the desired effect. For example, for a cutter having a first diameter 402, the helical cutting insert 400 is pivoted to a first angle 404 with respect to a central axis 406 of the cutter, as shown in FIG. 19a. For a cutter having a second, larger diameter 408, the helical cutting insert 400 is pivoted to a second angle 410 that is larger than the angle 404 for the first diameter 402, as shown in FIG. 19b. By doing so, the radiused helical cutting edges 466, 468 of the helical cutting insert 400 are capable of maintaining full engagement with the workpiece during the cutting operation.

It will be appreciated that the features of the progressive cutting edges 102, 104 of the helical cutting insert 100, an axial clearance slash 202, 204 forming a wiper 206, 208 on the edge of the axial clearance slash 202, 204 of the helical cutting insert 200, and/or an inside cutting edge 310, 312, along with the wiper radius 306, 308 on the edge of the axial clearance slash 302, 304 of the cutting insert 300 can be included on the helical cutting insert 400 of the invention.

As described above, the cutter system of the invention is designed to create a continuous true helical cut. In addition, the cutter system of the invention provides an indexable helical insert that is indexable on at least two cutting edges by rotating the insert 180 degrees. Thus, the cutter system of the invention provides for a more cost-effective cutter system because indexing the insert maintains cutting diameter and edges, unlike scrapping the entire cutter when the insert is worn or broken in a conventional solid endmill design.

It will be appreciated that the indexable cutting insert of the invention is not limited to the type of cutter body, and that the invention can be practiced with other types of cutter body designs. For example, the indexable cutting insert of the present invention can be utilized in a cutter system that includes a shell end mill type of cutter body. In another example, the indexable cutting insert of the invention can be utilized in a cutter system that includes another type of end mill cutter body, commonly known as a "router".

While the invention has been specifically described in connection with certain specific embodiments thereof, it is to be understood that this is by way of illustration and not of limitation, and the scope of the appended claims should be construed as broadly as the prior art will permit.

What is claimed is:

1. A helical cutting insert, comprising:
    a front face having a helically radiused curvature;
    at least two opposing side walls that each include a helical cut face with respect to a central, longitudinal axis of the insert, wherein a helical cutting edge is defined at an intersection between said front face and said at least two opposing side walls,
    wherein at least one helical cutting edge is concave, thereby enabling said cutting insert to perform machining operations on cutters having different diameters.

2. The cutting insert of claim 1, wherein said cutting insert mounted on a first cutter and said cutting insert is pivoted at a first angle with respect to a central axis of the first cutter with a first diameter to perform a machining operation on the first cutter.

3. The cutting insert of claim 2, wherein said cutting insert mounted on a second cutter and said cutting insert is pivoted at a second angle with respect to the central axis of the second cutter with a second diameter to perform a machining operation on the second cutter.

4. The cutting insert of claim 1, further comprising at least one axial clearance slash extending from a bottom surface to one of said side walls forming a wiper on an edge of the axial clearance slash.

5. The cutting insert of claim 1, wherein the cutting insert is indexable.

6. The cutting insert of claim 1, wherein the cutting insert is generally diamond in shape.

7. The cutting insert of claim 1, wherein said cutting insert includes at least one inside cutting edge that extends outwardly a distance from the side wall.

* * * * *